Figure 1A:
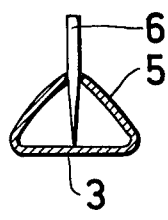

United States Patent [19]

Thorsman

[11] 3,955,462
[45] May 11, 1976

[54] FASTENER WITH DEFORMABLE PORTION FOR GUIDING PINS OR THE LIKE

[76] Inventor: Oswald Willy Thorsman, 31 Stenbrovagen, Nykoping, Sweden, 61100

[22] Filed: Apr. 17, 1973

[21] Appl. No.: 351,900

[30] Foreign Application Priority Data
Apr. 21, 1972 Sweden .............................. 5254/72

[52] U.S. Cl. .................................. 85/10 R; 85/17
[51] Int. Cl.² ........................................ F16B 19/14
[58] Field of Search ............... 85/10 R, 10 E, 10 C, 85/13, 16, 17, 54, 55, 85

[56] References Cited
UNITED STATES PATENTS

| 967,208 | 8/1910 | Leslie ...................................... 85/17 |
| 2,961,210 | 11/1960 | Pfaff et al ............................ 85/10 E |
| 3,320,845 | 5/1967 | Eschweiler .......................... 85/10 E |
| 3,377,903 | 4/1968 | Korte .................................. 85/10 E |
| 3,382,751 | 5/1968 | Kopf .................................... 85/10 E |
| 3,459,095 | 8/1969 | Hsu et al. ............................ 85/10 E |
| 3,490,329 | 1/1970 | Pratorius ............................. 85/10 E |
| 3,491,648 | 1/1970 | Thurner et al. ..................... 85/10 E |
| 3,491,933 | 1/1970 | Thurner et al. ..................... 85/10 E |
| 3,779,373 | 12/1973 | Maier .................................. 85/10 E |

FOREIGN PATENTS OR APPLICATIONS

| 590,609 | 7/1947 | United Kingdom ..................... 85/16 |
| 1,072,132 | 6/1967 | United Kingdom ................. 85/10 E |
| 1,391,722 | 2/1965 | France .............................. 85/10 R |
| 1,535,110 | 6/1968 | France .............................. 85/10 E |
| 46-18044 | 5/1971 | Japan .............................. 85/10 E |

*Primary Examiner*—Marion Parsons, Jr.
*Attorney, Agent, or Firm*—Fred Philpitt

[57] ABSTRACT

This invention relates to a fastener combination comprising an anchoring element and a guide member for said anchoring element said guide member comprising a bottom plate and a superstructure that projects upwards from the bottom plate and bridges over it so as to form with the bottom plate a covered cavity.

14 Claims, 17 Drawing Figures

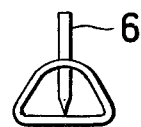
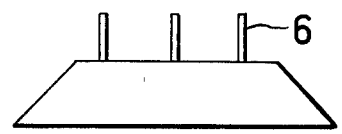
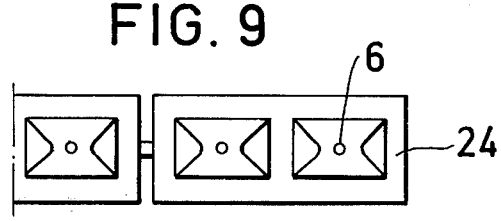
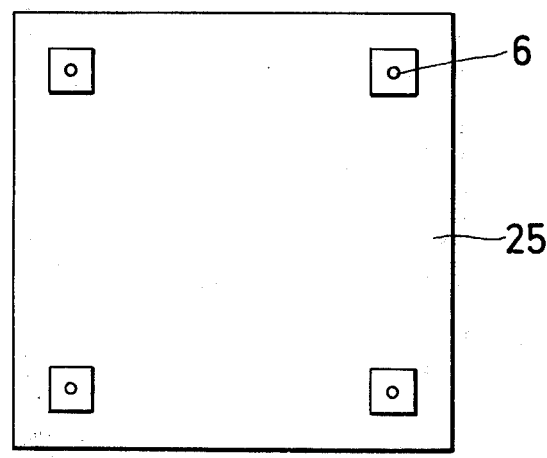
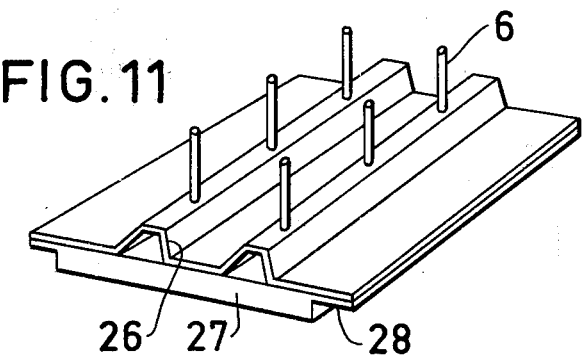

FASTENER WITH DEFORMABLE PORTION FOR GUIDING PINS OR THE LIKE

When fasteners of various types were to be secured on a base of particularly one of the aforesaid materials by means of pins or the like, it was always a problem to drive the pins into the base in such a manner, that the fasteners remain at the base, at least with sufficient strength. This problem was tried to be solved by establishing, as mentioned above, some kind of guidance for the pins whilst they are being driven. One solution was disclosed in the Danish Pat. No. 108,744, which describes and shows a hook with a relatively thick fastening plate of plastic, into which three pins are inserted and driven simultaneously into the base, with a certain guidance by the thick fastening plate. Another solution is described and shown in the Swedish patent specification 346 463 where the fastener in the form of a fastening plate or the like comprises a thin layer of a hard material, for example metal, located closest to the base, and a layer of greater thickness of a softer material, for example plastic, on the outside of the thin layer. Said outside layer serves here as a guidance, but the lower layer is intended primarily for increasing the resistance of the fastener against pulling-out forces.

The present invention has as its object to improve still more the strength and retaining force of a fastener of the kind referred to in the introductory portion, whereby in addition a very good guidance of the pins is obtained which increases as the driving goes on. The fastening unit resulting after completed driving, moreover, is of low height, contrary to the fasteners mentioned above.

The invention is substantially characterized by the combination of a substantially plane bottom plate for placing against the base and constituting a lower guide portion at said driving into the base, at least one superstructure projecting upwards from said bottom plate so as therewith to form a cavity and constituting an upper guide portion at said driving, at least one pin for arrangement with tight fit in said superstructure at its portion located farthest away from the bottom plate and directed substantially perpendicularly to said plate, in such a manner, that the distance between said portion and the bottom plate corresponds to a substantial part of the pin length, and the superstructure and the bottom plate guide said pin at said driving whilst at the same time flattening the superstructure so that it abuts the bottom plate.

The superstructure provides for the pin a very good guidance, which owing to the successive flattening of the superstructure increases as the driving goes on. The fastener is thereby held safely also in bases of the aforesaid types, and the strength of the final fastening unit is many times greater than that of conventional fasteners. The design according to the invention also permits the use of pins having a greater diameter than heretofore possible. By the flattening of the superstructure, furthermore, the resulting fastening unit is attractive and of a suitably low height. The superstructure, after having performed its function as a guide, may even be abolished, which may be expedient at certain fasteners.

Figure 1B:
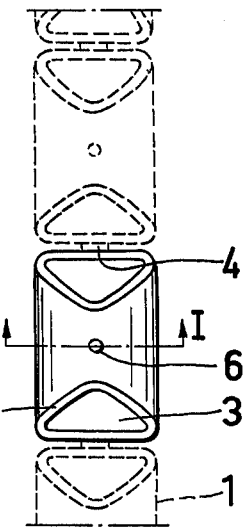
Figure 1C:
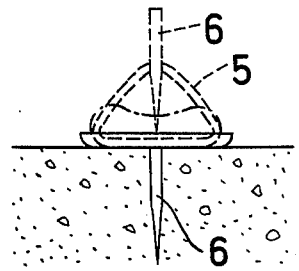
Figure 2A:
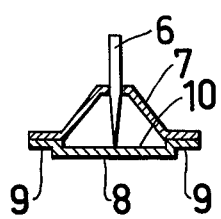
Figure 3A:
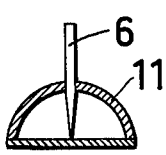
Figure 3B:
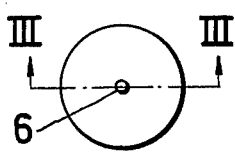
Figure 4A:
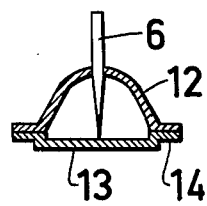
Figure 4B:
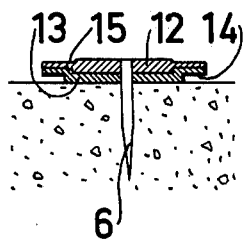
Figure 5:
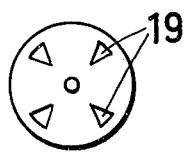
Figure 6:
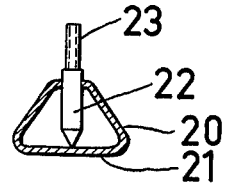
Figure 7:
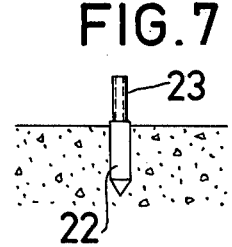

Further characterizing features and advantages of the invention will become apparent from the following description of some embodiments of fasteners according to the invention, with reference to the accompanying drawings, in which FIG. 1 shows a first embodiment of a fastener, FIG. 1a showing a section along the line I—I in FIG. 1b, FIG. 1b showing a horizontal projection, and FIG. 1c showing the fastener in several different phases during the driving operation, FIGS. 2a and b show a section corresponding to FIG. 1a of a similar embodiment and, respectively, a corresponding section after the fastener is secured on a base, FIGS. 3a and b show a further embodiment of a fastener according to the invention in a section after the line III—III in FIG. 3b and, respectively, in a horizontal projection, FIGS. 4a and b show a fastener similar to the embodiment according to FIG. 3 in a section corresponding to FIG. 3a and, respectively, a corresponding section after the fastener was secured on a base, FIG. 5 shows a horizontal projection of a variant of the fasteners shown in FIGS. 3–6, FIG. 6 shows still another embodiment of a fastener according to the invention in a section corresponding to FIG. 1a, FIG. 7 shows an example of the fastener according to FIG. 8 in secured position, FIGS. 8a and b show by an end view and, respectively, lateral view another embodiment of a fastener according to the invention which, different from above embodiments, has several pins inserted in one and the same fastener, FIGS. 9 and 10 show horizontal projections of further embodiments of fasteners with several pins, and FIG. 11 shows a perspective view of still another embodiment of a fastener according to the invention with several pins.

At the embodiment shown in FIG. 1, the fasteners are manufactured of a tubular material piece 1, which in FIG. 1b is indicated by dashed lines. The fasteners were formed by V-shaped cutouts 2 in the direction to the planed surface 3 of the tubular piece, and the fasteners relative each other are held together due to narrow strips 4 remaining at the cutouts in the surface 3 between the fasteners. Hereby is obtained an advantageous coherent unit of the fasteners, which one by one or, if several fasteners are to be driven into the base to the side of each other, several at a time can easily be separated from the unit. The arrangement of the fasteners in the tubular unit provides also the technically advantageous function that the unit can serve as a handle and assist in the driving of one or more fasteners whereafter the fasteners driven in are separated from the unit. This provides a good help during the driving of the fastener which is particularly valuable when the base is of the aforesaid kind. The tubular piece preferably may be manufactured by extrusion whereafter the slits are milled out of the tubular piece. The planed surface 3 provides a good contact surface against the base, but the tube may also have circular cross-section. The slits may also have a form different from that shown.

FIG. 1a shows a fastener in a section after the line I—I in FIG. 1b. The planed surface 3 of the fastener serves as a contact surface to the base, and into the superstructure or casing 5 above the surface 3 is inserted a pin 6 preferably by press fit. The pin abuts the surface 3 or is placed in a hole indication or a hole in the surface 3. FIG. 1c is intended to illustrate how the superstructure 5 guides the pin 6 whilst it is driven into, for example, a base of concrete. The fastener is shown by dashed lines prior to the driving and by fully drawn lines subsequent to the driving by which the superstructure 5 is flattened against the surface 3 and forms a low fastening connection. The dash-dotted lines indicate an intermediate position during the driving operation, from which can be seen how the superstructure 5 by the successive outward bulging and the central inward bulging provides a guidance to the pin which increases as the driving goes on.

Figure 2B:
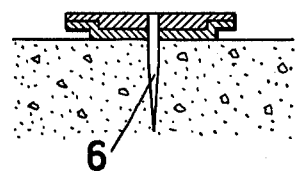

FIG. 2 shows another design of a fastener according to the invention where FIG. 2a shows the fastener prior and FIG. 2b shows the fastener subsequent to the driving of the pin 6. The superstructure, which here is designated by 7, has a form similar to that of the superstructure 5, but with plane sides instead of the curved ones according to the embodiment shown in FIG. 1. The superstructure form resembles here more that of a pyramid. The superstructure, furthermore, is here a separate part fastened at the lower portion designated by 8. The lower portion 8 differs from the lower portion 3 at the embodiment shown in FIG. 1 in that it is provided with edge recesses 9 and formed with a depression 10 in the surface facing the superstructure 7. As appears from FIG. 2b, subsequent to the driving a fastener is obtained which has guide grooves (the edge recesses 9) for an object to be attached to the fastener. Owing to the depression 10, into which the superstructure 7 is inserted at the flattening, a low connecting unit is obtained. FIG. 3 shows still another embodiment of a fastener according to the invention, at which the superstructure, which here is designated by 11, has a cap-shaped form (in the embodiment shown semi-spherical form). Subsequent to the driving of the pin 6, a button-like fastener is obtained.

In the embodiment shown in FIG. 4 the superstructure 12 has substantially the same shape. Its edges, however, are folded outwards and secured on the lower portion 13, which is formed with a circumferential recess 14. Subsequent to the driving, as appears from FIG. 4b, a button-like fastener with a circumferential flange 15 is obtained.

FIG. 5 shows a horizontal projection of a fastener with cap-like superstructure and with recesses 19 in the superstructure. Said recesses, which are provided in order to facilitate in certain cases the flattening of the superstructure, may, of course, also be made in fasteners of a design different from that shown.

The fastener in FIG. 6, with respect to superstructure 20 and lower portion 21, agrees with the fastener according to FIG. 1. The fastener, however, comprises at this embodiment a pin 22 of a greater thickness which shows a threaded portion 23 projecting above the superstructure. Subsequent to the driving of the pin 22, as appears from FIG. 7, a screw projecting outside the base is obtained. As also appears from FIG. 7, the superstructure 20 and the lower portion 21 may be abolished after they have served as a guide at the driving of the pin 22, whereby a clean fastening connection consisting of the screw 23 is obtained. Alternatively, however, the flattened superstructure and the lower portion may remain about the screw portion closest to the base.

FIGS. 8a and b show by an end view and, respectively, lateral view an embodiment of a fastener according to the invention, into which more than one pin 6 are inserted, for example as shown three pins.

FIG. 9 shows by a horizontal projection another embodiment of a fastener with several pins 6, where an underlying plate 24 forming the contact surface against the base is provided with a superstructure for each pin.

FIG. 9 also shows how several of such fasteners can be held together as units. FIG. 10 shows another embodiment of a fastener with several pins 6 and similar to that shown in the embodiment according to FIG. 9 provided with a superstructure for each pin and a plate 25 lying below the superstructures, with the superstructures being arranged at the corners of the plate. FIG. 11, finally, shows a further embodiment of a fastener according to the invention provided with several pins and several superstructures. The superstructures consist here of two parallel ridges 26, with three pins 6 in a row inserted in each ridge. The superstructures are arranged above a plate 27 with edge recesses 28. The resulting fastening connection subsequent to the driving is a plate with edge guide grooves, for example for obtaining a strong fastening connection for e.g. radiator suspension. It is, of course, possible to provide another number of ridges 26 and pins 6.

The pins preferably are steel pins, and the material in the remaining part of the fastener may preferably be metal, but also other materials may be used, for example plastic.

At the different embodiments the superstructure may be formed with a thickening or guide portion directed to the bottom plate, into which thickening or guide portion the pin is inserted in order to provide a still better support for the pin during its driving into the base.

In the FIGS. 1b and 9 above, by way of example some units for holding together the fasteners according to the invention were shown. The fasteners, for example, may be attached to a plastic casing by snap action or in another way, which casing not only serves as a packaging unit but, like the tubular piece according to FIG. 1a, has the technical function of serving as handle and support during the driving of the fasteners prior to their separation from the casing. At another type of packaging unit the fasteners may be arranged at a strip of, for example, plastic, in such a manner, that the pin portion projecting outside the superstructure for each fastener is secured in holes in the strip. In order to indicate different sizes of the fasteners, the fasteners proper or the packaging units may have different colours within a colour code system.

A fastener according to the invention can be used for securing different objects, for example by directly securing the object or by forming a fastener therefor. Examples of the lastmentioned application are the fasteners according to FIGS. 2 and 11 and, respectively, FIG. 6 for e.g. hooking on the object by means of edge guide grooves and, respectively, screwing on the object. At the hooking on of objects by using fasteners according to, for example, FIG. 2 or 11, only two steps are necessary, viz. the driving of the fastener with the guide grooves and thereafter hooking on of the object, compared with previously uses fasteners, at which first a hole had to be drilled, thereafter a plug be inserted and finally the object be secured by screwing. A fastener as shown, for example, in FIG. 3 or 4 may in addition to being a pure fastening element also constitute a decoration button. FIGS. 6 and 7 show examples of a fastener according to the invention used for inerting a screw into a concrete base. A fastener according to the invention may also be a part of a suspension means, such as for example a fastening plate at a picture hook, coat-hanger or the like. The applications mentioned are merely examples of a great number of application possibilities.

The invention, of course, is not restricted to the embodiments described above and shown in the drawing, but can be varied in several ways within the scope of the following claims.

What is claimed is:

1. A fastener combination characterized by:
   a. at least one anchoring element which is adapted to be driven into a base,
   b. a guide member for each said anchoring element which includes
      1. a substantially planar bottom plate that is adapted to rest against the base into which the anchoring element is to be driven, said bottom plate being adapted to serve as a support for the tip of said anchoring element prior to the time that a driving force is applied to said anchoring element and as a lower guide means for said anchoring element after force is applied,
      2. a superstructure extending upwardly from said bottom plate and bridging over it so as to form at least a partial roof over an area of said planar bottom plate and a cavity between such roof and the planar bottom plate, the area of said planar bottom plate that is covered by said superstructure roof being many times the cross-sectional area of said anchoring element, said superstructure:
         A. having an opening in the uppermost portion thereof that has an internal diameter which approximates the external diameter of said anchoring element,
         B. being symetrically shaped in relation to the anchoring element,
         C. having its lower portion joined to said substantially planar bottom plate around a junction line that defines an area many times greater than the area of said opening in the uppermost portion of the superstructure and
         D. having its uppermost portion that contains said hole spaced away from said planar bottom plate by a distance which is equal to a substantial portion of the length of the anchoring element,
   c. said anchoring element being in tight fit engagement with the hole in said superstructure portion and having its axis directed substantially perpendicular to the plane of said bottom plate and having a cross section substantially less than the largest cross section of said cavity in a plane perpendicular to said anchoring element, whereby during the course of driving said anchoring element into a base, said superstructure and said bottom plate will continue to guide said anchoring element until such time as the driving force has flattened said superstructure against said bottom plate and eliminated the cavity therebetween,
   d. said cavity between the bottom plate and the superstructure having a continuously decreasing cross section from the bottom plate up to the level for the engagement of the anchoring element in the superstructure.

2. The fastener combination according to claim 1 wherein said superstructure is formed integral with said bottom plate.

3. The fastener combination according to claim 1 wherein said superstructure is secured to said bottom plate.

4. The combination according to claim 1 wherein said bottom plate is provided with at least one edge recess forming guide groove for an object to be mounted on said fastener.

5. The combination according to claim 1 wherein the surface of said bottom plate facing said superstructure is formed with a depression, into which at least a substantial portion of said superstructure is forced during the course of driving said anchoring element into said base.

6. The fastener combination according to claim 1 wherein said guide member is formed of a piece of tubular material having at least one substantially planar surface, which tubular piece is slit open in selected lengths but held together along one portion of the planar surface in such a manner that each length corresponds to a guide member and the planar surface forms the bottom plate of the guide member.

7. The fastener combination according to claim 6 wherein said slits are symmetrically V-shaped and diverge outwardly with respect to said planar surface so as to form substantially pyramid-shaped guide members.

8. The fastener combination according to claim 1 wherein said superstructure is a cap-shaped body.

9. The fastener combination according to claim 8 wherein said cap-shaped body has semi-spherical form.

10. The fastener combination according to claim 1 wherein the portion of said anchoring element extending outside of said superstructure is threaded and this threaded portion has a dimension smaller than the portion of said anchoring element extending into said superstructure.

11. The fastener combination according to claim 1, wherein said superstructure is dimensioned to fall off subsequent to the driving and guiding of said threaded anchoring element into the base.

12. The fastener combination according to claim 1 wherein said superstructure is provided with recesses.

13. The fastener combination according to claim 1 wherein said anchoring element is inserted with press fit into said superstructure.

14. The fastener combination according to claim 1, wherein said bottom plate is provided with a plurality of said superstructures.

* * * * *